J. VOEGELE.
PLOW.
APPLICATION FILED MAR. 25, 1909.
960,743.
Patented June 7, 1910.
3 SHEETS—SHEET 3.
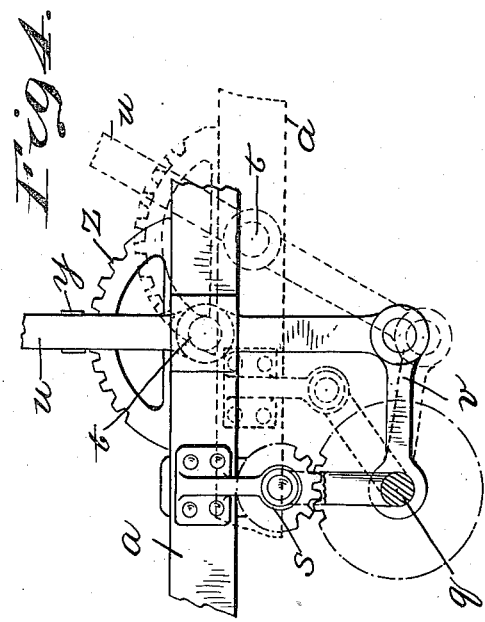
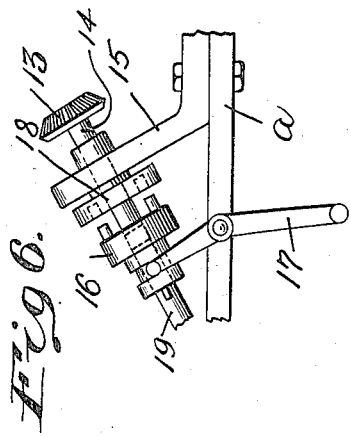
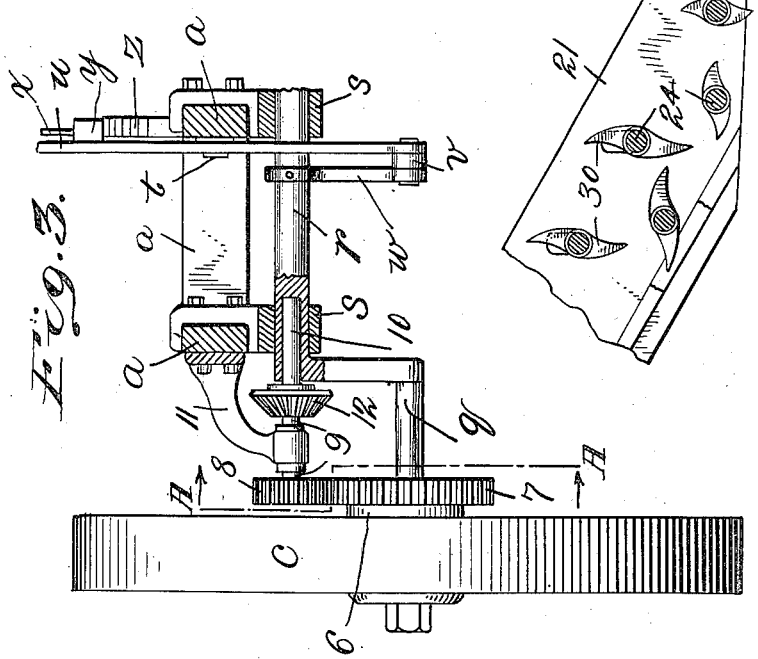
Witnesses:
M. Hamilton.
M. E. Campion.
John Voegele Inventor
By his Attorney
James Hamilton

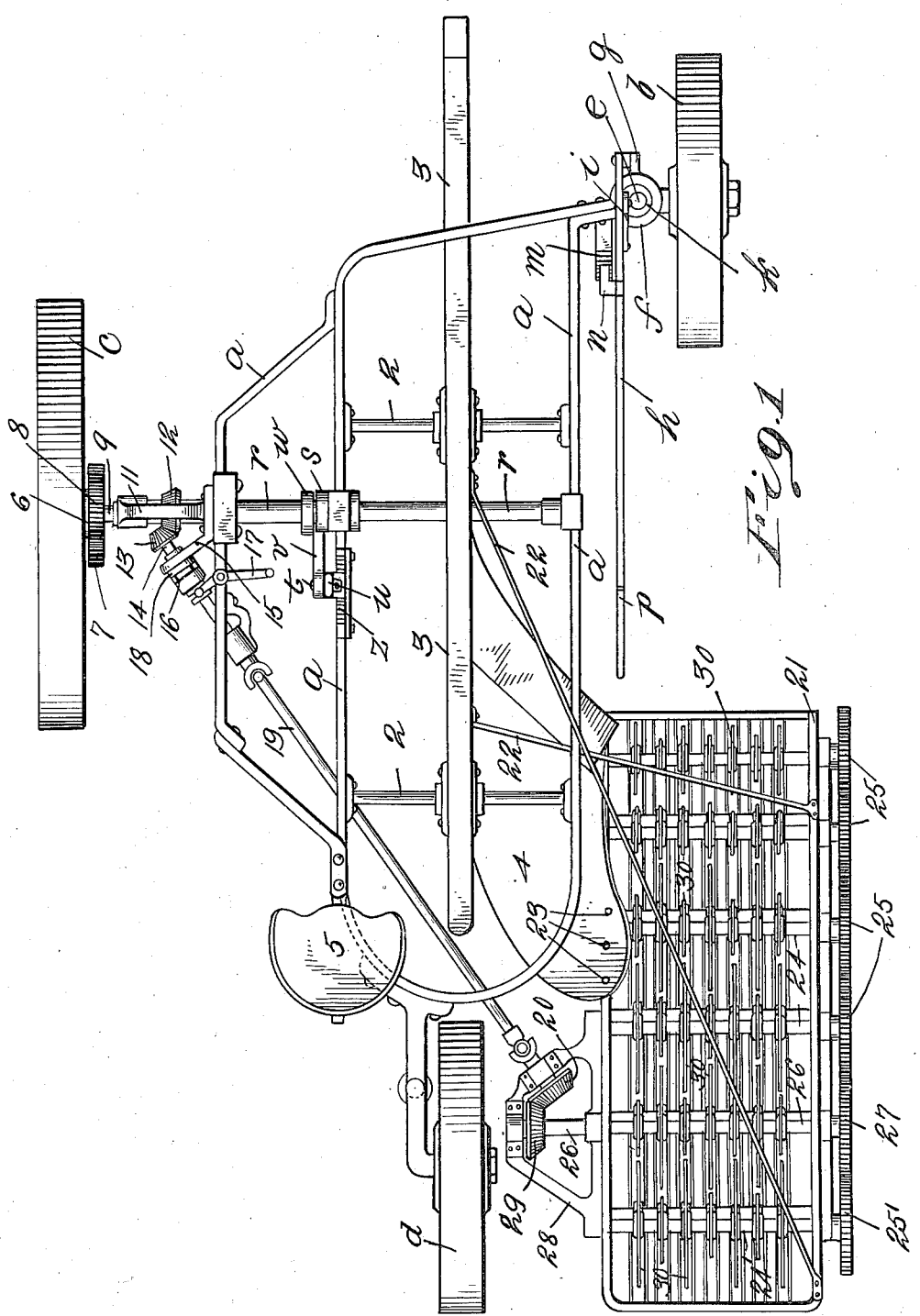

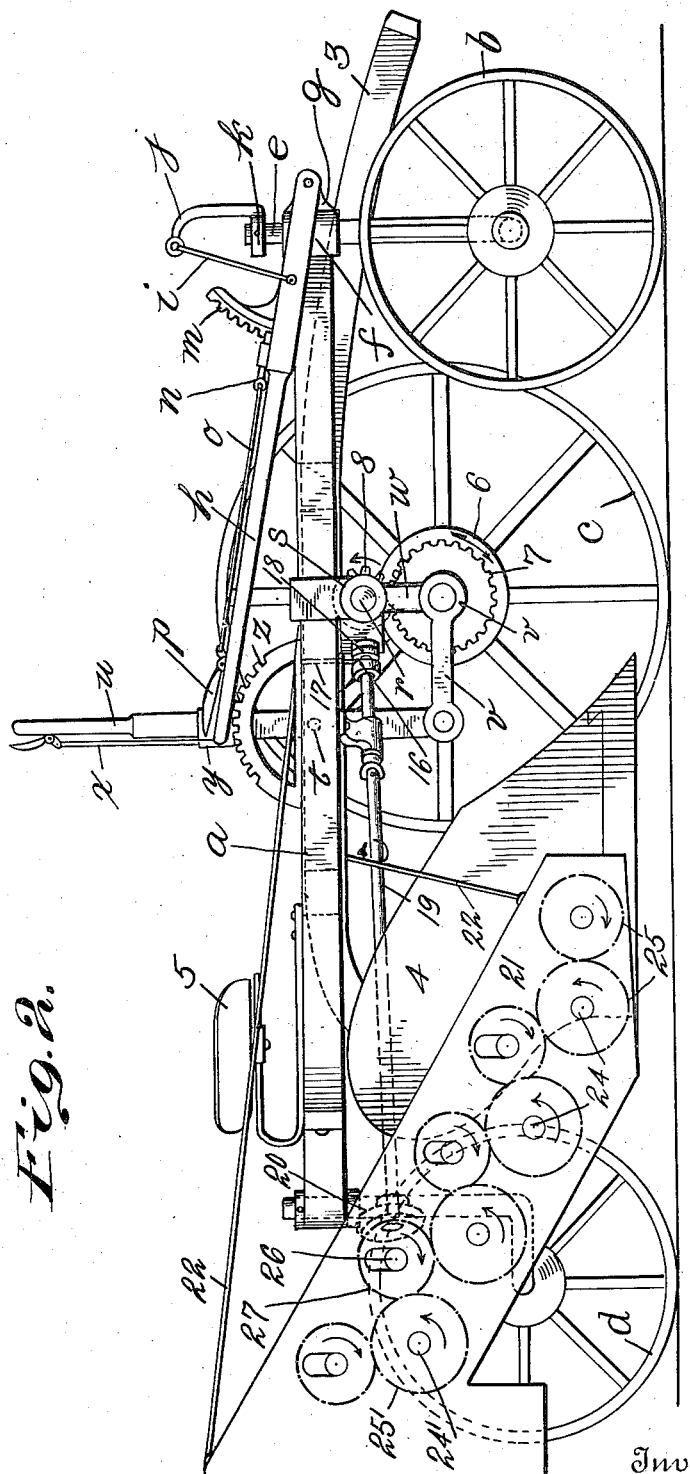

UNITED STATES PATENT OFFICE.

JOHN VOEGELE, OF FARIBAULT, MINNESOTA.

PLOW.

960,743.

Specification of Letters Patent.    Patented June 7, 1910.

Application filed March 25, 1909.    Serial No. 485,615.

*To all whom it may concern:*

Be it known that I, JOHN VOEGELE, a citizen of the United States, residing at Faribault, in the county of Rice and State of Minnesota, have invented certain new and useful Improvements in Plows, of which the following is a specification, reference being had to the accompanying drawings.

My invention relates to improvements in plows and particularly to improvements in plows for use in soil infested with the weed known as quack grass; and an object of my invention is to provide a plow which will be adapted to shred the soil and to separate therefrom this noxious weed and other weeds.

Another object of my invention is to provide a plow of the class just described which will be simple in construction, comparatively cheap in manufacture and most efficient in use.

In the drawings illustrating the principle of my invention and the best mode now known to me of applying that principle, Figure 1 is a plan of a sulky plow embodying my invention; Fig. 2 is an elevation of the plow shown in plan in Fig. 1; Fig. 3 is a detail partly in section showing the driving mechanism; Fig. 4 is a detail in section on the line A—A of Fig. 3; Fig. 5 is a detail showing the shredding teeth of the soil-disintegrator; and Fig. 6 is a detail of the clutch.

The frame members $a$ are supported by the land-wheel or guide-wheel $b$, the main wheel $c$ and the furrow-wheel or caster wheel $d$. The guide-wheel $b$ is mounted free to rotate on the lower end of the wheel-post $e$ which is slidably mounted in the collar $f$ at the right-hand front corner of the frame $a$ (Fig. 1). The collar $f$ is formed with a lug $g$ to which is pivotally attached the front end of the adjusting-lever $h$. The latter is connected by a link $i$ with the upper end of a bracket $j$ the lower end of which is in the form of a collar $k$ fastened to the upper end of the wheel-post $e$. To one of the frame-bars $a$ is fastened a stationary toothed sector $m$ with which coacts the detent or latch-dog $n$ pivotally mounted on the end of the latch-rod $o$ and controlled through the latter by the pivoted thumb-latch $p$ (Fig. 2). By releasing the latch-dog $n$ from the teeth of the toothed sector $m$, the lever $h$ is made free to be swung; and by swinging the lever $h$, the frame $a$ may be tilted, as will be readily understood by those skilled in this art.

The main wheel $c$ is free to rotate upon the stub-end $q$ of the transverse bent rock-shaft $r$. The latter is mounted free to turn in the hangers $s$ which are bolted to the frame-members or frame-bars $a$ (Fig. 3).

To one of frame-members $a$ is pivotally attached or fulcrumed at $t$ an operating-lever $u$, the lower end of which is connected by a link $v$ to one end of a rocker-arm $w$ the other end of which is fast upon the rock-shaft $r$. The lever $u$ carries a latch-rod $x$ and latch-dog $y$, by which it may be engaged with the stationary toothed sector $z$ fastened upon one of the frame-members $a$. By moving the lever $u$ back and forth, the frame $a$ may be raised and lowered, as will be readily understood by those skilled in this art.

Between a pair of the frame-bars $a$ are mounted the cross-bars 2 which support the plow beam 3. The latter carries the plow 4. A suitable seat 5 is provided for the driver upon the rear end of the frame $a$.

The construction so far as described is common to sulky plows and is no part of my invention.

The hub 6 of the wheel $c$ carries a spur-gear 7 which drives a pinion 8 fast upon the outer end of a shaft 9 the inner end 10 of which is journaled in the rock-shaft $r$ (Fig. 3). The shaft 9 is further supported by by a hanger 11 which is bolted to one of the frame-bars $a$. Upon the shaft 9 is mounted a bevel-gear 12 which meshes with the bevel-gear 13 on one end of a shaft 14 carried by the hanger 15. Upon the other end of the shaft 14 is fast a stationary clutch-disk 18 into and out of engagement with which may be thrown the slidable clutch-disk 16 by means of the clutch-lever 17. The slidable clutch disk 16 is keyed upon one end of the jointed shaft 19 the other end of which carries a bevel-gear 20.

The box-like housing or casing 21 of a soil disintegrator is connected by brace-rods 22 to the plow-beam 3 and is riveted to the plow 4 as indicated at 23. In the casing or housing 21 are journaled several shafts 24 upon the outer end of each of which is mounted a gear 25. These gears 25 are in mesh with each other. In the housing or casing 21 is journaled a driving-shaft 26 upon one end of which is fast a spur-gear 27 which meshes with one of the spur-gears 25 and with a spur-gear 25' upon the end of a shaft 24' journaled in the housing 21. The housing 21 carries a hanger-bracket 28 on one of its lateral faces and in the latter is journaled one end of the jointed shaft 19 and one end of the shaft 26 upon which is mounted fast a bevel-gear 29. The latter meshes with and is driven by the bevel-gear 20. Upon each of the shafts 24, 24', 26, are rigidly mounted teeth 30 which serve to disintegrate and shred the soil which is thrown into the housing or casing 21 by the plow 4 and which thereby loosen or separate the quack grass from the soil.

I claim:

1. In a plow, the combination of a plow-frame; a casing carried by said frame; a plow carried by said frame and arranged to turn the soil into said casing; soil-disintegrating devices mounted in said casing; a bent rock-shaft on which said frame is carried; a wheel in which one end of said rock-shaft is rotatably mounted and is supported; means for swinging said rock-shaft to raise and lower said frame, plow and casing with respect to said wheel; mechanism for actuating said soil-disintegrating devices; and connecting means which connect said mechanism and wheel, whereby said wheel is adapted to drive said mechanism and thereby said soil-disintegrating devices; said connecting means being carried by said frame in line with that portion of said bent rock-shaft upon which said plow-frame is carried.

2. In a plow, the combination of a plow-frame; a casing carried by said frame; a plow carried by said frame and arranged to turn the soil into said casing; a bent rock-shaft on which said frame is carried; a wheel in which one end of said rock-shaft is rotatably mounted and is supported; means for swinging said rock-shaft to raise and lower said frame, plow and casing with respect to said wheel; mechanism for actuating said soil-disintegrating devices; and connecting means which connect said mechanism and wheel, whereby said wheel is adapted to drive said mechanism and thereby said soil-disintegrating devices; said connecting means being carried by said frame and that portion of said bent rock-shaft upon which said plow-frame is carried.

3. In a plow, the combination of a plow-frame; a casing which is attached to said frame and which moves up and down therewith; a plow which is attached to said frame and which moves up and down therewith; a bent rock-shaft on which said frame is carried; a wheel in which one end of said rock-shaft is rotatably mounted and is supported; a lever which is carried by said frame and which is connected with said rock-shaft to swing the same and thereby to raise and lower simultaneously said frame, casing and plow with respect to said wheel; mechanism for actuating said soil-disintegrating devices; and connecting means which are attached to said frame and which connect said wheel and mechanism, whereby said wheel is adapted to drive said mechanism and thereby said soil-disintegrating devices.

In testimony whereof I have hereunto set my hand, at said Faribault, this 18th day of March, A. D., 1909, in the presence of the two undersigned witnesses.

JOHN VOEGELE.

Witnesses:
G. W. BATCHELDER,
CHAS. S. BATCHELDER.